Figure 1:
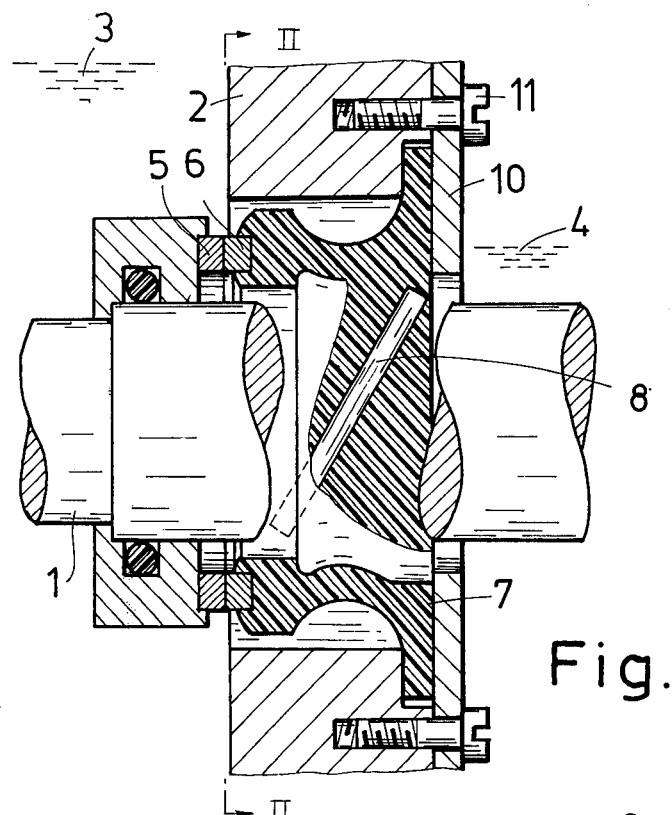

United States Patent [19]

Lund

[11] 4,061,345
[45] Dec. 6, 1977

[54] SEAL FOR A ROTATING SHAFT

[75] Inventor: Rolf Lund, Kauniainen, Finland

[73] Assignee: Oy E. Sarlin AB, Vantaa, Finland

[21] Appl. No.: 792,304

[22] Filed: Apr. 29, 1977

[30] Foreign Application Priority Data

May 3, 1976 Finland .............................. 761235

[51] Int. Cl.² ............................................. F16J 15/34
[52] U.S. Cl. ......................................................... 277/88
[58] Field of Search ................... 277/4, 42, 88, 89, 90, 277/164

[56] References Cited

U.S. PATENT DOCUMENTS

| | | | |
|---|---|---|---|
| 2,077,954 | 4/1937 | Ramclow | 277/42 |
| 2,753,198 | 7/1956 | Ayling | 277/4 |
| 3,160,418 | 12/1964 | Barske | 277/90 |
| 3,165,323 | 12/1965 | Hamano | 277/89 |
| 3,370,895 | 2/1968 | Cason | 277/88 |
| 3,372,076 | 3/1968 | Wilkinson | 277/88 |
| 3,975,026 | 8/1976 | Boyle et al. | 277/4 |

Primary Examiner—Robert I. Smith
Attorney, Agent, or Firm—Haseltine, Lake & Waters

[57] ABSTRACT

Seal for the purpose of carrying a rotating shaft throught a wall and which comprises a rotating seal ring and a stationary seal ring abutting thereagainst, whereof one has been connected with the shaft and the other with the wall and whereof one is located at the end of a rubber bellows producing an axial sealing pressure. Within the wall of the rubber bellows there is at least one metal pin, which is positioned obliquely with reference to the shaft.

9 Claims, 6 Drawing Figures

SEAL FOR A ROTATING SHAFT

Seals of this kind are employed, for instance, in submerged pumps, where two liquieds such as oil and water for instance are separated from each other. In order to ensure an axial sealing pressure, spiral springs are often used as load imposing means.

When the spring in known seals is placed on the side of the rotating sealing ring, the spring may be built for instance into the rubber bellows, whereby the rubber bellows acts as seal between the ring and the shaft. The reliability of operation of the seal implies that a certain torque is transmitted from the shaft to the ring. The positive ensuring of this action usually requires its own ancillary means. If the rubber bellows is made rigid enough for the transmitting of torque, it usually loses its other good properties. When the spring is placed on the side of the stationary sealing ring, the spring may also be mounted on the oil side of the seal. In this case, too, ensuring of the torque action often requires extra additional means.

The object of the present invention is to eliminate the drawbacks mentioned and to accomplish a seal comprising the fewest possible and simplest possible components.

The seal according to the invention is characterized in that within the rubber bellows there is at least one metal pin, which is located at an angle with regard to the shaft. Thereby a rigid enough structure with regard to torque is obtained and still the freedom of movement of the bellows and its elasticity in axial direction are preserved.

A favourable embodiment of the invention is characterized in that the main shape of the rubber bellows is that of a single shell hyperboloid. Another embodiment of the invention is characterized in that the pins are straight. If the rubber bellows is made as thin as possible in that in the bellows straight pins are incorporated at a slant to the central line, the shape of the bellows will be a hyperboloid.

A third embodiment of the invention is characterized in that the number of metal pins is two and that they are located on opposite sides of the rubber bellows. Hereby the forces arising from the torque will be symmetrically distrubted in the bellows.

Still another favourable embodiment is characterized in that the pins are positioned in the wall of the bellows at a slant in one and the same direction. In that case a highly elastic structure is obtained, because all pins yield in the same direction. A certain more rigid structure is characterized in that the pins are positioned within the wall of the bellows and slanting in different directions.

Still one favourable embodiment is characterized in that the pins have two and two been connected with each other to constitute a U-shaped body. By this design a more rigid fixing is obtained at one end of the pins. One favourable embodiment is also characterized in that the pins have been connected with each other, two and two, to constitute a body of rectangular configuration. By this design both ends of the pins are secured and the connecting pins serve as hinges when the bellows yield elastically in axial direction.

Still one favourable embodiment is characterized in that the pins have been made from metal wire by bending. This is a simple and inexpensive manufacturing procedure.

The invention is described in the following with reference being made to the attched drawing, wherein:

FIG. 1 presents a seal according to an embodiment of the invention, in sectional view.

Figure 2:
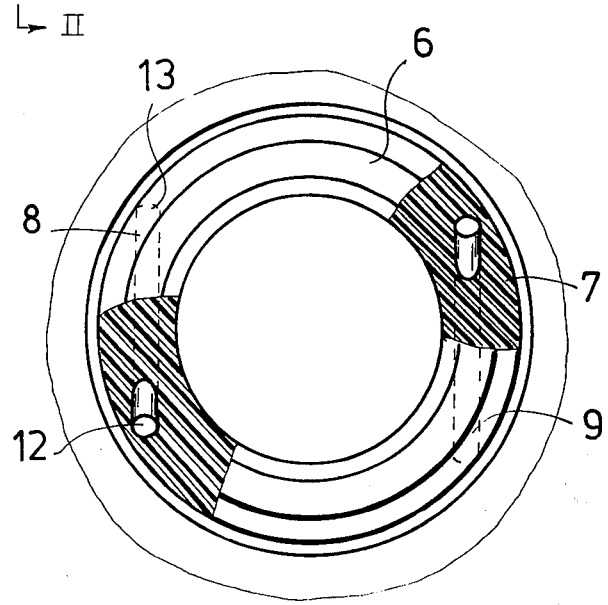

FIG. 2 shows the section carried along line II—II in FIG. 1 and from which all other parts except the bellows have been omitted.

Figures 3, 4:
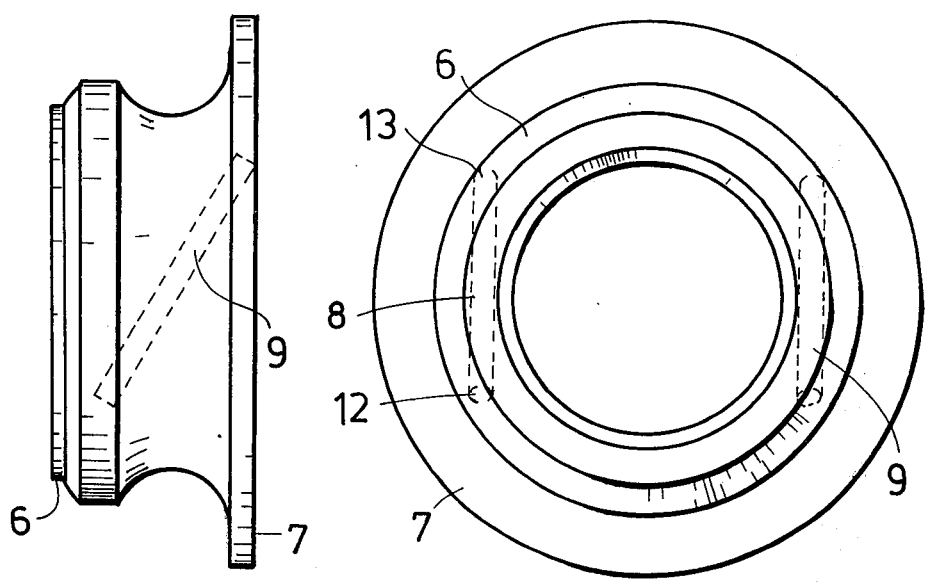

FIG. 3 presents another embodiment of the invention, wherein the pins have different directions in the wall.

FIG. 4 shows the same bellows as FIG. 3, but viewed from one end.

Figures 5, 6:
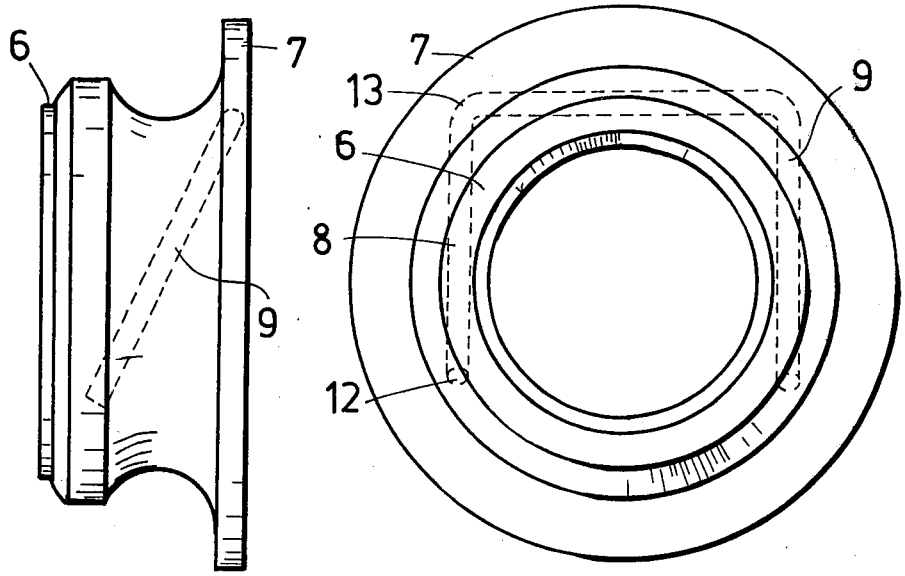

FIG. 5 presents a third embodiment of the bellows, wherein the pins have been connected with each other.

FIG. 6 shows the same bellows as FIG. 5, but viewed from one end.

In FIG. 1 a seal construction according to the invention is seen, wherein 1 is the shaft, 2 is a partition, 3 is a liquid containing immpurities, 4 is oil, 5 is a rotating ring affixed to the shaft, 6 is a stationary sealing ring elastically disposed in the partition, 7 is a rubber bellows, its action being to accomplish sealing between the ring 6 and the wall 2, to impose a load axially on the ring 6 and to prevent rotation of the ring 6, 8 is one of the pins vulcanized into the rubber 7, 10 is a retaining ring and 11 is a fixing screw. In the figure, the shape of the pin between points 12 and 13 is rectilinear and slanting with reference to the shaft 1. The mantle of the rubber bellows is roughly uniform in thickness and it has been so shaped that the pin is completely embedded in the rubber, whereby the configuration of the rubber mantle is in principle that of a hyperboloid with a single shell. Thanks to this arrangement, the rubber bellows can be made so soft that the freedom of motion of the ring 6 may be ensured with sufficiently small counter-forces. The pins 8 and 9 ensure the torque action and they lend support to the rubber bellows in such manner that the rubber bellows is enabled to act as an axial load imposing means for the ring 6. The pins may be mounted either so that they are all obliquely positioned in the same direction, as shown in FIGS. 1 and 2, or mounted obliquely in different directions, as illustrated by FIGS. 3 and 4. The pins may furthermore be connected two and two to constitute one body, as has been presented in FIGS. 5 and 6.

It is obvious to a person skilled in the art that different embodiments of the invention may vary within the scope of the claims following below. For instance, the pins may be somewhat bent, the ends of the pins may be rounded, the surface of the pins may be grooved, knurled or sand blasted so that it adheres well to rubber. In FIG. 1 a case has been depicted wherein the bellows is non-rotating, but it is equally possible to form the seal to be such that the bellows rotates along with the shaft.

I claim:

1. Improvement in a seal for carrying a rotating shaft through a wall, comprising a rotating sealing ring and a stationary sealing ring abutting thereagainst, one of these two being connected with the shaft and the other with the wall and one of the two being located at the end of a rubber bellows producing an axial sealing pressure, wherein the improvement comprises that within the wall of the rubber bellows there is at least one metal pin, which is positioned obliquely with reference to the shaft.

2. Seal according to claim 1, characterized in that the main configuration of the rubber bellows is that of a single shell hyperboloid.

3. Seal according to claim 1, characterized in that the pins are straight.

4. Seal according to claim 1, characterized in that the number of metal pins is two and that they are located on opposite sides of the rubber bellows.

5. Seal according to claim 1, characterized in that the pins are located within the wall of the bellows slanting in the same direction.

6. Seal according to claim 1, characterized in that the pins are located within the wall of the bellows slanting in different directions.

7. Seal according to claim 1, characterized in that the pins have been connected with each other two and two to constitute a U-shaped body.

8. Seal according to claim 1, characterized in that the pins have been connected with each other two and two to constitute a body of rectangular shape.

9. Seal according to claim 7, characterized in that the pins have been made by bending from metal wire.

* * * * *